United States Patent [19]

Cage

[11] Patent Number: 5,323,336

[45] Date of Patent: Jun. 21, 1994

[54] NOISE REMOVAL METHOD FOR AN ELECTRONIC COMPASS

[75] Inventor: Russell E. Cage, Ann Arbor, Mich.

[73] Assignee: Chrysler Corporation, Highland Park, Mich.

[21] Appl. No.: 815,269

[22] Filed: Dec. 27, 1991

[51] Int. Cl.$^5$ .............................................. G01B 7/00
[52] U.S. Cl. ................................. 364/574; 364/559; 364/571.05; 73/1 E
[58] Field of Search ...................... 364/559, 574, 581, 571.01–571.08; 73/1 E

[56] References Cited

U.S. PATENT DOCUMENTS

| | | |
|---|---|---|
| 3,899,834 | 8/1975 | Harrison, Jr. . |
| 3,991,361 | 11/1976 | Mattern et al. . |
| 4,424,631 | 1/1984 | Franks . |
| 4,425,717 | 1/1984 | Marcus . |
| 4,505,054 | 3/1985 | Clark et al. . |
| 4,546,551 | 10/1985 | Franks . |
| 4,622,646 | 11/1986 | Waller et al. . |
| 4,677,381 | 6/1987 | Geerlings . |
| 4,698,912 | 10/1987 | Fowler et al. . |

FOREIGN PATENT DOCUMENTS

| | | |
|---|---|---|
| 0120691 | 10/1984 | European Pat. Off. . |
| 60-135814 | 7/1985 | Japan . |
| 2056686 | 3/1981 | United Kingdom . |

Primary Examiner—Jack B. Harvey
Assistant Examiner—Jae H. Choi
Attorney, Agent, or Firm—Mark P. Calcaterra

[57] ABSTRACT

A method for removing noise from data in an electronic compass system which discounts noise values or outliers (extreme headings far from average) by displaying median headings in the absence of a clear trend in the direction of change of sampled headings. If a clear trend is detected, extreme headings are displayed. Compass jitter is reduced by requiring two consecutive differences be on the same side of the displayed heading before the displayed heading is changed.

2 Claims, 3 Drawing Sheets

Right turn

Left Turn

Straight Ahead

Right turn

Left Turn

Straight Ahead 5,323,336

NOISE REMOVAL METHOD FOR AN ELECTRONIC COMPASS

CROSS-REFERENCE TO RELATED APPLICATIONS

The present application is related to the following, co-pending applications filed concurrently herewith:

"Scaling System And Method For An Electronic Compass", application Ser. No. 07/815,347, presently pending;

"Shifting System And Method For An Electronic Compass System", application Ser. No 07/815,267, presently pending;

"Data Processing Method For An Electronic Compass System", application Ser. No. 07/815,266, presently pending;

"Heading Computation For An Electronic Compass", application Ser. No. 07/815,346, presently pending;

"Magnetic Transient Detection And Calibration Technique For An Auto-Calibrating Compass", application Ser. No. 07/815,268, presently pending;

"Method For Selecting Calibration Data For An Auto-Calibrating Compass", application Ser. No. 07/815,264, presently pending;

"Flux-gate Sensor Orientation Method", application Ser. No. 07/815,265, presently pending;

"Flux-Gate Sensor Mounting And Method", application Ser. No. 07/815,270, presently pending;

"A Method For Interpreting Magnetic Direction For A Compass On A Vehicle", application Ser. No. 07/815,274, presently pending.

The disclosures of all the applications cited above are hereby incorporated by reference and made a part hereof the same as if fully set forth herein.

BACKGROUND OF THE INVENTION

1. Technical Field

The present invention relates to electronic compasses and more specifically to a method for removing noise from data in an electronic compass system.

2. Discussion

Normally electronic compass systems employ a magnetic flux-gate sensor. An example of an electronic compass system can be found in U.S. Pat. No. 4,622,843 to Hormel, issued Nov. 18, 1986, entitled "Simplified Calibration Technique and Auto-Ranging Circuit for an Electronic Compass Control Circuit." This reference is hereby incorporated by reference.

The operation of the flux-gate sensor is well documented. See, "Magnetic Field Sensor and its Application to Automobiles", SAE Paper 800123, pages 83–90, February, 1980, by Hisatsugu Itoh and "A Magnetic Heading Reference for the Electro Fluidic Autopilot", Sport Aviation by Doug Garner, Part I, pages 19–26, November, 1981 and Part II, pages 20–32, 51, December, 1981. The disclosures of these documents are hereby incorporated by reference.

A method for calculating headings is found in U.S. Pat. No. 4,807,462 issued Feb. 28, 1989, to Al-Attar entitled "Method for Performing Automatic Calibration in an Electronic Compass." This patent is also hereby incorporated by reference.

Signals from flux-gate sensors are often less than clean. Compass accuracy is plagued by rapid changes in field strength. For example, a vehicle passing local magnetic anomalies at high speed causes noise signals. Transients and other time variant magnetic fields also create noise.

This noise manifests itself as Jitter in the compass reading. When compass data is displayed in degrees, the heading fluctuates in small degree increments. When compass data is displayed as a compass point, for example, "northwest", jitter can cause a display displaying such information to vary greatly in brightness.

SUMMARY OF THE INVENTION

An object of the present invention is to remove noise from electronic compass systems without compromising response time or accuracy.

An object of the present invention is to remove noise from electronic compass systems after headings are calculated.

Thus, in accordance with the teachings of the present invention a method for removing noise from data in an electronic compass system is provided.

In a preferred embodiment, outliers (extreme) headings are discounted by displaying median headings in the absence of a trend. If a trend is detected, extreme headings are displayed. Displayed heading is initialized by calculating a current heading. A current heading is calculated again. The method then compares the current heading to the displayed heading. If the displayed heading is less than the current heading, and if the last displayed heading is less than the last heading calculated, then the displayed heading is set to the current heading. If the displayed heading is greater than the current heading and the last displayed heading is greater than the last heading calculated, then the displayed heading is also set equal to the current heading; otherwise, the displayed heading remains the same. A new current heading is then calculated.

BRIEF DESCRIPTION OF THE DRAWINGS

Other objects and advantages of the invention will become apparent upon reading the following detailed description and upon reference to the drawings, in which.

DETAILED DESCRIPTION OF THE PREFERRED EMBODIMENT

In a preferred embodiment, outliers or noise values are discounted by displaying median headings in the absence of a trend. Outliers are defined as extreme headings, far from average. If a trend is detected, however, extreme headings are displayed. For example, the latest value in a left or right turn that is continuous enough to evidence a trend is an extreme heading which is displayed.

The median of an odd series of numbers is defined as the middle number. In the case of an even series of numbers, the median is the midpoint between the two middle numbers. Mean or average values are not used because they give weight to all values, including outliers.

Figure 1:
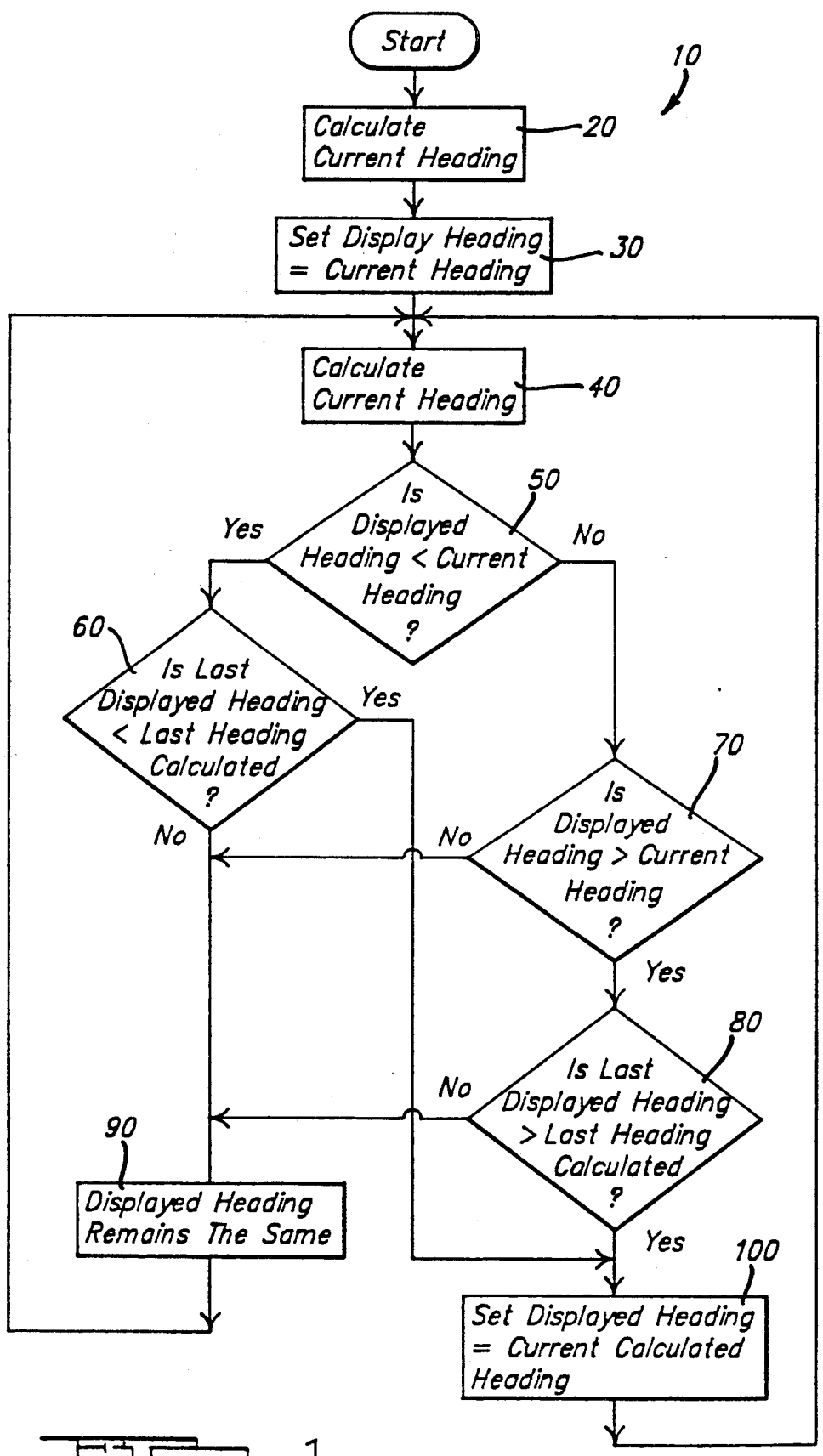
FIG. 1 is a flowchart illustrating the method of removing noise from data in an electronic compass system.

Turning now to FIG. 1, there is shown a simple routine 10 to be executed by the microcomputer of an electronic compass system. The routine 10 begins, in block 20, by calculating a current heading based upon the signals received through a flux-gate sensor. The calibration method of the '462 patent may be used. The current heading is then displayed in block 30 to initialize the routine. The routine then evaluates this current heading for reliability.

In block 40, a new heading is then calculated, which becomes the current heading. Starting with block 50, if the displayed heading is less than the current heading and, in block 60, if the last displayed heading is less than the last heading calculated, then the vehicle is making a right turn. The current heading is accepted and displayed, as shown in block 100. In block 70, if the displayed heading is greater than the current heading and, in block 80, if the last displayed heading is greater than the last heading calculated then the vehicle is making a left turn. Continuous left and right turns are detected as clear trends in the direction of change of heading points. Thus, the current heading is accepted and displayed as shown in block 100. Median headings are not displayed when clear trends are detected, since displayed heading would lag by one sample. Avoiding such lag was an explicit aim of the algorithm. In pseudo-code:

```
If (last_samp > disp_hdg AND this_samp > disp_hdg )
   then disp_hdg = this_samp; /* Clear trend up */
else if (last_samp < disp_hdg AND this_samp < disp_hdg )
   then disp_hdg = this_samp; /* Clear trend down */
else /* do nothing, no clear trend */ ;
```

This algorithm functions well as a low-pass filter, eliminating jitter at frequencies more than 1/6 the sample rate.

After block 100, a current heading is calculated again in block 40. If the vehicle continues turning either right or left, then the current heading of block 40 will be accepted and displayed. However, if the vehicle turns erratically or proceeds on a straight ahead course, then a clear left or right trend does not exist. One of the conditions may not be satisfied. For block 90, the displayed heading remains the same and the current heading in block 40 is rejected. The displayed heading is the median of itself and the last two samples. The current heading is once again calculated and the process repeats itself.

The routine 10 follows trends quickly. If the headings are changing smoothly, as in a continuous left or right turn, the conditions in blocks 60, 70, and 80 always evaluate true, and the current heading is displayed, in block 100, every iteration. Advantageously, the routine 60 does not require storing the last heading calculated and last displayed heading, but only the results of the comparison between them—a mere two bits. In noisy conditions, two consecutive differences on the same side of the displayed heading are required to alter the displayed heading; this cuts down the frequency of updates and reduces display jitter.

Figure 2A:
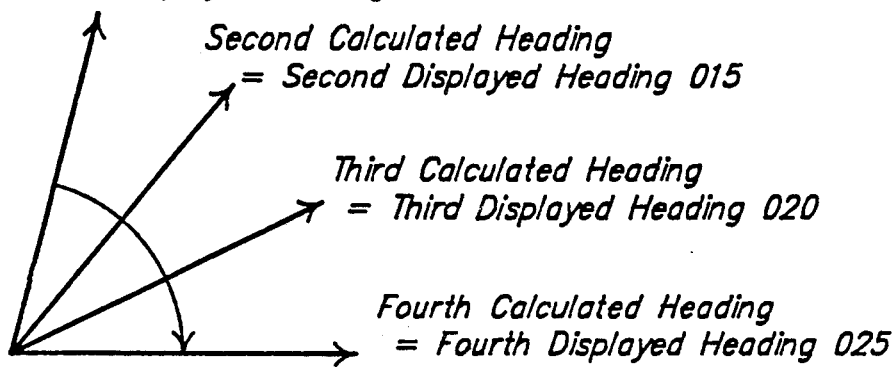
FIG. 2a is a ray diagram illustrating the method of removing noise during a right turn.

FIGS. 2(a) and (b) more clearly illustrate how the conditions 60, 70, and 80 of FIG. 1 always evaluate true in a smooth turn. In FIG. 2(a) a right turn is being made by the vehicle, given an initial displayed heading of 010, a second calculated heading of 015, and a second displayed heading of 015. The vehicle continues its turn to the right and calculates a third heading of 020. The conditions 50 and 60 are satisfied, therefore, the third displayed heading becomes 020. If a fourth heading is calculated in the turn of 025, the conditions 50 and 60 remain satisfied and the fourth displayed heading becomes 025.

Figure 2B:
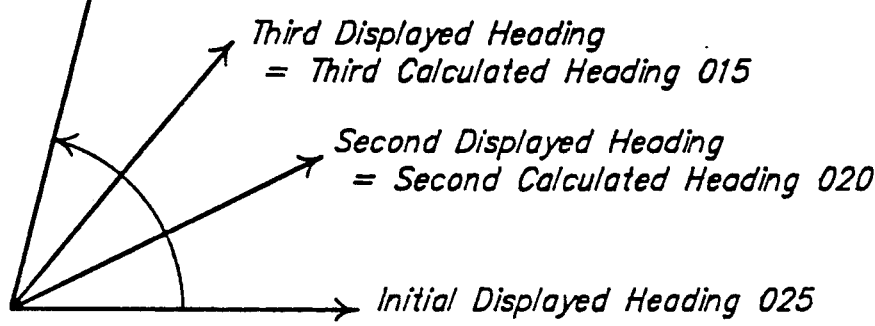
FIG. 2b is a ray diagram illustrating the method of removing noise during a left turn.

Similarly, in FIG. 2(b) a left turn produces smooth results. Given are an initial displayed heading of 025, a second calculated heading of 020, and a second displayed heading of 020. As the vehicle turns, calculates a third current heading of 015. The conditions 70 and 80 are satisfied; therefore, the third displayed heading becomes 015. If the vehicle turns further, and the electronic compass calculates a fourth heading of 010, then the conditions 70 and 80 remain satisfied and the fourth displayed heading becomes 010.

Figure 2C:
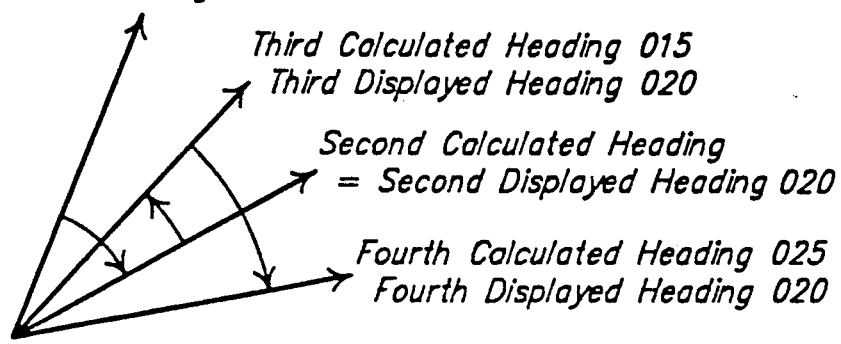
FIG. 2c is a ray diagram illustrating the method of removing noise during straight ahead travel.

FIG. 2(c) illustrates the effectiveness of this method in eliminating noise values or outliers. Given are an initial displayed heading of 010, a second calculated heading of 020, and a second displayed heading of 020. A third heading of 015 is calculated. The condition 70 is true, but the condition 80 is not satisfied; therefore, the displayed heading of 020 remains the same. If a current heading of 025 is then calculated, it too will be discarded and the display heading will remain the same at 020. However, if after the current calculated heading of 015, a current heading of 005 or 018 is calculated, then the condition will be satisfied, illustrating the fact that two consecutive differences on the same side of the displayed heading are required to alter the displayed heading.

Note that the course information in FIGS. 29a)–(c) was chosen for simplicity. Intervals of five degrees were chosen to promote understanding. Actual course information is preferably updated much more rapidly. The preferred update interval is on the order of every 0.5 seconds to 2 seconds. Using an interval which is too short will cause the algorithm to track noise; using an interval which is too long will cause unacceptable lag, and possibly eliminate the need for this filtration method.

Figure 3:
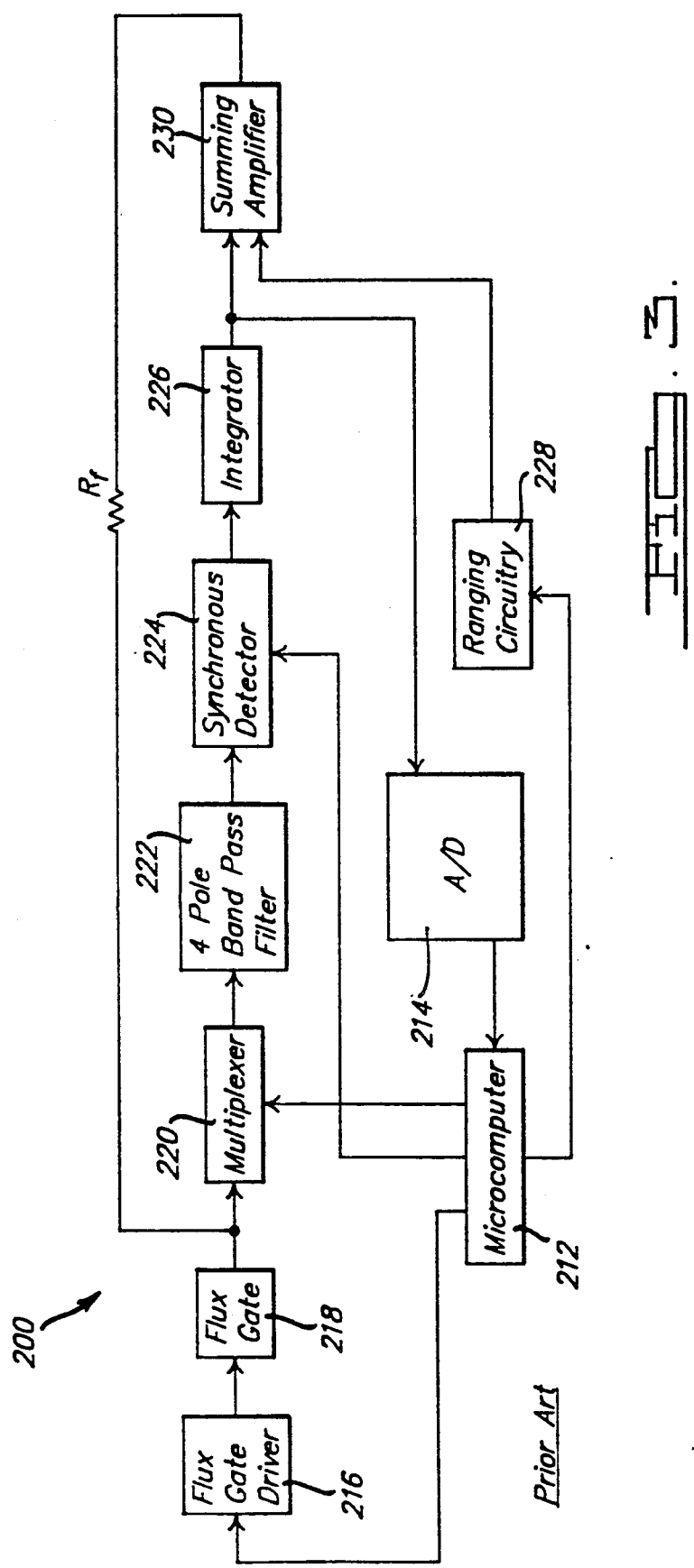
FIG. 3 is a block diagram of the electronic compass system of the '843 patent to Hormel.

Turning now to FIG. 3, there is shown a block diagram of an electronic compass system 200 capable of using the method of the present invention, the '843 patent to Hormel. The heart of the system is a microcomputer 212 which employs an 8-bit analog-to-digital converter 214. The microcomputer 212 controls operation of the electronic compass system 200, beginning with a flux-gate driver 216. Upon receipt of a square-wave signal from the microcomputer 212, the flux-gate driver 216 adds enough drive to the signal to saturate a flux-gate 218. The operation of the flux-gate driver 216 and flux-gate 218 are explained in the documents incorporated by reference, namely "A Magnetic Heading Reference for the Electro/Fluidic Autopilot" and "Magnetic Field Sensor and its Application to Automobiles, (SAE Paper No. 800123)". The flux-gate employs two sense coils oriented perpendicularly to one another. Voltages are induced across the sensor coils by the presence of the magnetic fields of the vehicle and the earth.

The voltages from the sense coils of the flux-gate 218 are processed by a multiplexer 220. The multiplexer 220 is in communication with the microcomputer 212, which generates a signal for controlling a network for switching use of a four-pole bandpass filter 222, a synchronous detector 224 and an integrator 226 periodically from one sense coil to the other. The multiplexer 220 is in communication with the four-pole bandpass filter 222, which filters out all but the second harmonic signals, whose amplitude is proportional to the earth's magnetic field.

Second harmonic signals are presented to the synchronous detector 224. The function of the synchronous detector 224 is to select the portion of the filtered signals to be integrated by the integrator 226. The output of the synchronous detector 224 is a half-wave rectified signal which is fed into the integrator 226.

The output of the integrator 226 periodically switches back and forth between two DC levels corresponding to the two sense coils of the flux-gate 218. Integrator 226 output is stabilized by feeding back a current through resistor $R_f$ to the sense coils of the flux-gate 218. The feedback current eventually becomes an equal and opposite signal versus that produced by the magnetic field sensed by the flux-gate 218.

Heading information is determined from the output of the integrator 226. The microcomputer 212 is coupled to the integrator output through the 8-bit analog-to-digital converter 214. The 8-bit analog-to-digital converter 214 converts the DC levels to digital coordinates referenced to a cartesian coordinate system. The microcomputer 212 divides the y-coordinate, corresponding to the DG level from one coil, by the x-coordinate, corresponding to the other coil, and takes the arctangent of the quotient using a piece-wise-linear-function-of-x routine to yield the vehicle's heading.

Armed with the foregoing detailed description of the sequence of operations carried out by the preferred embodiment of the present invention, those of ordinary skill in the art will readily be able to write their own suitable software to operate a microcomputer-based electronic compass system in accordance with the teachings herein. Accordingly, the details of such software need not be described here. The software may be written in any suitable language, such as a lower-level language like assembly language, or a higher-level language such as "C". Similarly, virtually all of the digital aspects of the control circuitry for an electronic compass system of the present invention may be implemented with any suitable general-purpose microcomputer with off-chip or on-chip A/D capability, or may be implemented in an application-specific integrated circuit custom-designed for handling the required processing activities. Armed with the teachings of the present invention disclosed herein, those of the ordinary skill in the art are well-equipped to implement the present invention in any suitable combination of the digital and/or analog circuits. Accordingly, further details of such hardware need not be described here.

Although the invention has been described with particular reference to certain preferred embodiments thereof, variations and modifications can be effected within the spirit and scope of the following claims, for example, other embodiments might check more than the last two data points and might not update the displayed heading unless more than one or two points were on one side of the current calculated heading.

What is claimed is:

1. A method for noise and outliers from data values for an electronic compass, said method comprising:
   (a) orienting first and second sense coils of a flux-gate sensor perpendicular to each other in the earth's magnetic field;
   (b) saturating said sense coils with a drive signal;
   (c) measuring an induced voltage in said sense coils induced by said magnetic field;
   (d) calculating a first heading related to said induced voltage using a processing unit and storing said first heading in a memory unit connected to said processing unit;
   (e) calculating and storing a second heading related to said induced voltage using said processing and memory units;
   (f) calculating and storing a third heading related to said induced voltage using said processing and memory units;
   (g) determining a median heading of said three stored heading using said processing unit;
   (h) displaying said median heading on a display unit when a currently displayed heading is less than said third stored heading and a last displayed heading is greater than said second stored heading;
   (i) displaying said median heading on said display unit when said currently displayed heading is greater than said third stored heading and said last displayed heading is less than said second stored heading;
   (j) displaying said third stored heading when said currently displayed heading is less than said third stored heading and said last displayed heading is less than said second stored heading; and
   (k) displaying said third stored heading when said currently displayed heading is greater than said third stored heading and said last displayed heading is greater than said second stored heading,
   wherein by selecting one of said median heading and said third stored heading for display using steps (h), (i), (j), and (k), noise and outliers are removed from said data values.

2. A method for removing noise and outliers from data values for an electronic compass, said method comprising:
   (a) orienting first and second sense coils of a flux-gate sensor perpendicular to each other in the earth's magnetic field;
   (b) saturating said sense coils with a drive signal;
   (c) measuring an induced voltage in said sense coils induced by said magnetic field;
   (d) calculating a first current heading related to said induced voltage using a processing unit;
   (e) displaying said first current heading on a display unit;
   (f) calculating a second current heading related to said induced voltage using said processing unit;
   (g) displaying said second current heading;
   (h) calculating a third current heading related to said induced voltage using said computing means;
   (i) displaying said third current heading when said third current heading is greater than said second displayed heading and said first displayed heading is less than said second current heading;
   (j) displaying said third current heading when said third current heading is less than said second displayed heading and said first displayed heading is greater than said second current heading; and
   (k) displaying said second displayed heading when steps (i) and (j) are not met,
   wherein by selecting one of said third current heading and said second displayed heading for displaying using steps (i), (j), and (k), noise and outliers are removed from said data values.

* * * * *